United States Patent [19]

Ficker et al.

[11] Patent Number: 4,684,683

[45] Date of Patent: Aug. 4, 1987

[54] INJECTION BLOW MOLDING GRADE PROPYLENE POLYMERS

[75] Inventors: Harold K. Ficker, Wayne, N.J.; Frederick M. Teskin, Herndon, Va.

[73] Assignee: El Paso Products Company, Odessa, Tex.

[21] Appl. No.: 762,902

[22] Filed: Aug. 6, 1985

[51] Int. Cl.[4] .............................. C08K 5/09; C08K 5/20
[52] U.S. Cl. ..................................... 524/220; 524/218; 524/223; 524/224; 524/228; 524/229; 524/242; 524/243; 524/244; 524/245; 524/583
[58] Field of Search ............... 524/243, 327, 242, 218, 524/220, 223, 228, 583, 229, 224, 244, 245

[56] References Cited

U.S. PATENT DOCUMENTS

| Re. 27,404 | 6/1972 | Williams, Jr. et al. | 526/352.2 |
| 3,165,492 | 1/1965 | Tholstrup et al. | 524/229 |
| 3,886,227 | 5/1975 | Van Brederode et al. | 525/286 |
| 3,969,304 | 7/1976 | Pugh et al. | 524/229 |
| 4,147,742 | 4/1979 | Castro et al. | 524/223 |
| 4,184,026 | 1/1980 | Carrock et al. | 524/288 |
| 4,314,040 | 2/1982 | Castro et al. | 524/249 |
| 4,322,503 | 3/1982 | Chatterjee | 524/229 |
| 4,393,159 | 7/1983 | Lybrand | 524/243 |
| 4,520,163 | 5/1985 | Goodall | 525/247 |
| 4,543,389 | 9/1985 | Burstain et al. | 526/903 |

FOREIGN PATENT DOCUMENTS 0020718  10/1963  Japan .................................. 524/229

Primary Examiner—Herbert J. Lilling
Attorney, Agent, or Firm—Fred S. Valles; Margareta LeMaire

[57] ABSTRACT

An injection blow molding grade resin or improved clarity and processability is obtained by incorporating N,N[1]-ethylene bisstearamide and an ethoxylated amine into a sodium benzoate nucleated propylene polymer.

6 Claims, No Drawings

INJECTION BLOW MOLDING GRADE PROPYLENE POLYMERS

BACKGROUND OF THE INVENTION

Propylene polymers produced in the presence of support-based, high activity coordination catalysts generally do not require deashing prior to use and therefore contain acidic catalytic residues which need to be neutralized prior to processing of the polymer. In order to improve the polymer clarity sodium benzoate can be added as a nucleating agent, however, because of the presence of catalytic residues and neutralizing agents in the polymer, the improvement in clarity has not been as great as what would be desired. In the concurrently filed application Ser. No. 762,904 filed Aug. 6, 1985 there is provided a method for synergistically improving the clarity and also color of a propylene polymer nucleated with sodium benzoate which comprises adding an ethoxylated amine to the polymer in the absence of calcium stearate. It was unexpectedly found that the incorporation of the ethoxylated amine into the sodium benzoate-nucleated polypropylene resin improved the clarity, as measured by percent haze, and reduced the yellownesh index in a synergistic manner, i.e., these properties were far better than what could be predicted from those obtained by use of sodium benzoate alone and ethoxylated amine alone. However, a drawback of the resulting resins in that they do not process satisfactorily on injection blowing molding equipment.

THE INVENTION

In accordance with this invention, there is provided a method for improving the processability and unexpectedly further improving the clarity of an undeashed propylene polymer, which has been prepared in the presence of a high-activity catalyst composition containing a magnesium halide-supported titanium halide catalyst component, which method comprises adding sodium benzoate, N,N[1]-ethylene bisstearamide and an ethoxylated amine to the polymer in the absence of calcium stearate, melting the resulting mixture and solidifying the melted mixture.

The polymers which are useful in this invention ar derived predominantly from propylene (i.e., at least 75% by weight) and are produced by well-known processes involving the use of any of the recently developed supported, highly active and stereospecific catalysts. Generally, these new catalysts are comprised of an aluminum alkyl component and a titanium compound supported on magnesium dihalide as a second component. Homopolymers, copolymers of propylene with other simple 1-olefins such as ethylene and butene-1, and blends thereof can be used. Also, other 1-olefin resins can be blended with any of the aforementioned propylene resins, e.g. linear low density polyethylene (LLDPE) which is an interpolymer of ethylene and at least one $C_4$-$C_8$ 1-olefin. The LLDPE resins are mainly categorized according to density rather than chemical composition and should have a density in the range between about 0.915 and about 0.940. The polymerized propylene content of the total polymer, whether it be composed of one or more components should preferably be at least 80% by weight. Random copolymers of propylene and ethylene containing between about 2 and about 10 wt% ethylene, and mixtures of such random copolymers with a LLDPE resin are especially suitable.

In order to improve the lack of clarity generally associated with highly crystalline propylene polymers, sodium benzoate is added to the propylene polymer, thereby controlling the rate of crystal growth as the molten polymer solidifies upon cooling in the final molding step. Any known process may be used to incorporate the sodium benzoate, which is usually added to provide a concentration of from about 0.01 to about 1% by weight based on the polymer weight, preferably from about 0.05 to about 0.5 wt.%. For instance, the techniques disclosed in U.S. Pat. Nos. 3,207,739, 3,367,926, 3,637,634 and 4,184,026 (hereby incorporated into this application by reference) are all suitable.

One or more neutralizing agents should be added to the polymer in quantities effective to reduce the corrosive effect of the support-based catlyst residues present in the polymer and to increase the thermal stability of the polymer. Such neutralizing agents are well-known and commercially available. Suitable neutralizing compounds include the hydroxides of sodium, potassium and calcium oxides of calcium and magnesium, sodium carbonate, calcium carbonate, magnesium hydroxycarbonate and mixtures thereof. Generally, the concentration of neutralizer should range between about 0.01 to about 3% by weight based on the polymer weight. This concentration does not include the sodium benzoate and the ethoxylated amine, which also act as neutralizers.

To increase the thermal and oxidative stability of the polymer, any of the well-known commercially available antioxidants such as hindered phenols, phenolic phosphites, secondary aryl amines and the like, should be incorporated into the polymer resin usually in quantities between about 0.01 to about 1%, preferably between about 0.05 to about 0.5% by weight based on the polymer weight. Examples of such antioxidants include butylated hydroxytoluene, tetrakis methylene-(3,5-di-t-butyl-4-hydroxyhydrocinnamate)methane, (1,3,5-trimethyl-2,4,6-tris(3,5-t-butyl-4-hydroxybenzyl)benzene, bis(2,4-2,4-di-t-butylphenyl)pentaerythritol diphosphite, phenylenediamines, 3,5-di-tert-butyl-4-hydroxyhydrocinnamic acid triester with 1,3,5-tris(2-hydroxyethyl)-s-triazine-2,4,6(1H,3H,5H)-trione and many others.

The N,N[1]-ethylene bisstearamine should be added to provide a concentration between about 0.01 and about 1 wt%, preferably between about 0.05 and about 2 wt.%, based on the polymer weight.

The ethoxylated amine useful in this invention should be a saturated, fatty acid alkanol amine derived from fatty acids containing from 8 to 20 carbon atoms. Examples of such ethoxylated amines are bis(hydroxyethyl)-cocoamine, bis(hydroxyethyl)tallow amines, bis(hydroxyethyl)myritylamine, etc. These compounds are commercially available to be used as internal antistatic agents. When used as a clarifying agent as in the method of this application, the concentration should be in the range from about 0.05 to about 0.5% by weight.

Other special function additives can also be incorporated into the polymer such as colorants, antiblocking agents, etc., provided that the additive is not a metal stearate such as calcium stearate.

Any conventional nucleation technique may be used for uniformly dispersing the additives within the polymer, for melting the polymer and for solidifying the polymer, and therefore need not be discussed in any further detail.

Shaped articles may be manufactured from the mixtures according to this invention by casting, compression molding or injection molding; films may be obtained by blowing or by slit extrusion; filaments, bars, tapes and the like, may be obtained by extrusion.

Various details of the invention will be more fully understood in perspective of the specific illustrative embodiments described in the following examples.

EXAMPLES 1-3

The resin used in each of the blends of Examples 1-3 was a random copolymer of 97.2 wt% propylene and 2.8 wt.% ethylene having a melt flow rate of 2.7 g/10 min (ASTM 1238D) and containing 200 ppm or butylated hydroxytoluene (BHT). The polymer was undeashed and had been produced in the presence of a high activity magnesium chloride-supported titanium chloride catalyst in a slurry polymerization process employing propylene monomer as liquid diluent.

The blends were prepared to contain the same amount of antioxidant stablizer, in this case 1,3,5-trimethyl-2,4,6-tris(3,5-t-butyl-hydroxybenzyl)benzene (Ethyl 330), and also of primary neutralizer, i.e., aluminum magnesium hydroxycarbonate (Kyowa DHT-4A).

The additives incorporated into each of the blends are indicated in Table 1. Where included, the sodium-benzoate was added to the resin as a 10 wt.% solution in a n-propanol/water azeotrope solvent (71.8/28.2 wt% composition). After intensive mixing for about 5 minutes under nitrogen atmosphere the blend was dried under nitrogen at about 65° C. for 3 hours.

The blends were then extruded at a nominal 500° F. melt temperature and pelletized. 50 mil plaques were injection molded from the pellets and these were tested for percent haze (ASTM D1003). Also, from each pelletized blend 20, 4-qt. size Boston round bottles were injection blow-molded on a Jomar molding machine. The bottles were tested for visual clarity employing a rating scale from 1 to 5, with the value of 5 being designated as the worst see-through clarity. The molding process performance was measured and was based on the degree of sticking during the injection blow-molding using the following ratings:

Good—bottles molded without any sticking to core-pins.

Fair—slight sticking to core-pins during molding.

Poor—excessive sticking requiring manual release of bottles from pins.

The test results are showin in Table 1.

TABLE 1

| Example No. | Comp. 1 | Comp. 2 | 3 |
|---|---|---|---|
| Additives-ppm | | | |
| Ethyl 330 | 1000 | 1000 | 1000 |
| DHT-4A | 1000 | 1000 | 1000 |
| Na Benzoate | — | 1000 | 1000 |
| Armostat 410 | — | 1000 | 1000 |
| Ca Stearate | 1000 | — | — |

TABLE 1-continued

| Example No. | Comp. 1 | Comp. 2 | 3 |
|---|---|---|---|
| Acrawax-C | — | — | 1000 |
| Results | | | |
| Haze - % | 56 | 44 | 32 |
| Visual Clarity | 5 | 2.5 | 2.5 |
| Process Performance | Good | Poor | Good |

The rsults from Comparative Experiments 1 and 2 show that the test samples of sodium benzoate nucleated resin also containing an ethoxylated amine (in this case bis-hydroxyethyl cocamine sold under the trademark Armostat 410) had improved clarity properties, i.e., reduction in percent haze as well as in visual clarity. However, the resin of Example 2 processed poorly in the injection blow-molding machine due to the absence of calcium stearate lubricant which, if present, would have interacted with the sodium benzoate and caused an unwanted poor clarity. By the addition of N,N¹-ethylene bisstearamide (available commercially, e.g., under the trademark Acrawax C) in Example 3 to the composition of Example 2, not only was the processability completely restored, but also, and entirely unexpectedly, the haze was further improved to a much lower value than previously possible.

It is to be understood that many modifications and alterations can be made to this invention without departing from its scope, which is defined by the specification and appended claims.

What is claimed is:

1. A method for improving the processability and clarity of an undeashed propylene polymer prepared in the presence of a high-activity catalyst composition containing a magnesium halide-supported titanium halide catalyst component which comprises:

(a) adding sodium benzoate, from about 0.01 to about 1 wt. % of N,N¹-ethylene bisstearamide and from about 0.05 to about 0.5 wt.% of an ethoxylated amine to the polymer in the absence of calcium stearate the percentages being based on the weight of the polymer, (b) melting the resulting mixture and (c) solidifying the melted mixture.

2. The method of claim 1 wherein the propylene polymer resin contains at least 75% by weight of polymerized propylene constituents.

3. The method of claim 2 wherein at least a portion of the propylene polymer resin is a random copolymer of from about 2 to about 10 wt% of ethylene and from about 90 to about 98 wt% of propylene.

4. The method of claim 1 wherein the concentration of sodium benzoate is between about 0.01 and about 1 wt% based on the weight of the polymer.

5. The method of claim 1 wherein the ethoxylated amine is bis(hydroxyethyl)cocoamine.

6. The method of claim 1 wherein aluminum magnesium hydroxy carbonate is added to the propylene as neutralizer.

* * * * *